(12) United States Patent
Tsukuda

(10) Patent No.: US 7,574,129 B2
(45) Date of Patent: Aug. 11, 2009

(54) IMAGING APPARATUS

(75) Inventor: Kumiko Tsukuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 346 days.

(21) Appl. No.: 11/488,865

(22) Filed: Jul. 19, 2006

(65) Prior Publication Data
US 2007/0031139 A1 Feb. 8, 2007

(30) Foreign Application Priority Data
Aug. 3, 2005 (JP) ............................ P2005-225106

(51) Int. Cl.
G03B 17/00 (2006.01)
G03B 7/00 (2006.01)
H04N 5/235 (2006.01)
H04N 5/76 (2006.01)

(52) U.S. Cl. .................... 396/265; 396/222; 348/221.1; 348/231.7; 358/909.1

(58) Field of Classification Search ......... 396/263–265, 396/222; 358/906, 909.1; 348/220.1, 221.1, 348/231.99, 231.7
See application file for complete search history.

(56) References Cited

U.S. PATENT DOCUMENTS 5,241,334 A * 8/1993 Kobayashi et al. ............. 396/86
5,495,342 A * 2/1996 Harigaya et al. ............. 386/121

FOREIGN PATENT DOCUMENTS

| JP | 4-360384 | 12/1992 |
| JP | 6-326957 | 11/1994 |
| JP | 11-196321 | 7/1999 |
| JP | 2002-094852 | 3/2002 |
| JP | 2003-324651 | 11/2003 |
| JP | 2004-126242 | 4/2004 |
| JP | 2004-333554 | 11/2004 |
| JP | 2005-006926 | 1/2005 |
| JP | 2005-102106 | 4/2005 |

* cited by examiner

*Primary Examiner*—Rochelle-Ann J Blackman
(74) *Attorney, Agent, or Firm*—Finnegan, Henderson, Farabow, Garrett & Dunner, L.L.P.

(57) ABSTRACT

An imaging apparatus includes a photographing mode selector allowing a user to select an interval photographing mode from among a plurality of predetermined photographing modes, a determining unit determining a range of selectable time intervals for interval photographing in accordance with the interval photographing mode selected by the photographing mode selector, a notifying unit notifying the user of the range of selectable time intervals determined by the determining unit, a time interval selector allowing the user to select a time interval for interval photographing in response to the notification of the notifying unit, and an interval photographing controller performing interval photographing on the basis of the interval photographing mode selected by the photographing mode selector and the time interval selected by the time interval selector.

10 Claims, 5 Drawing Sheets

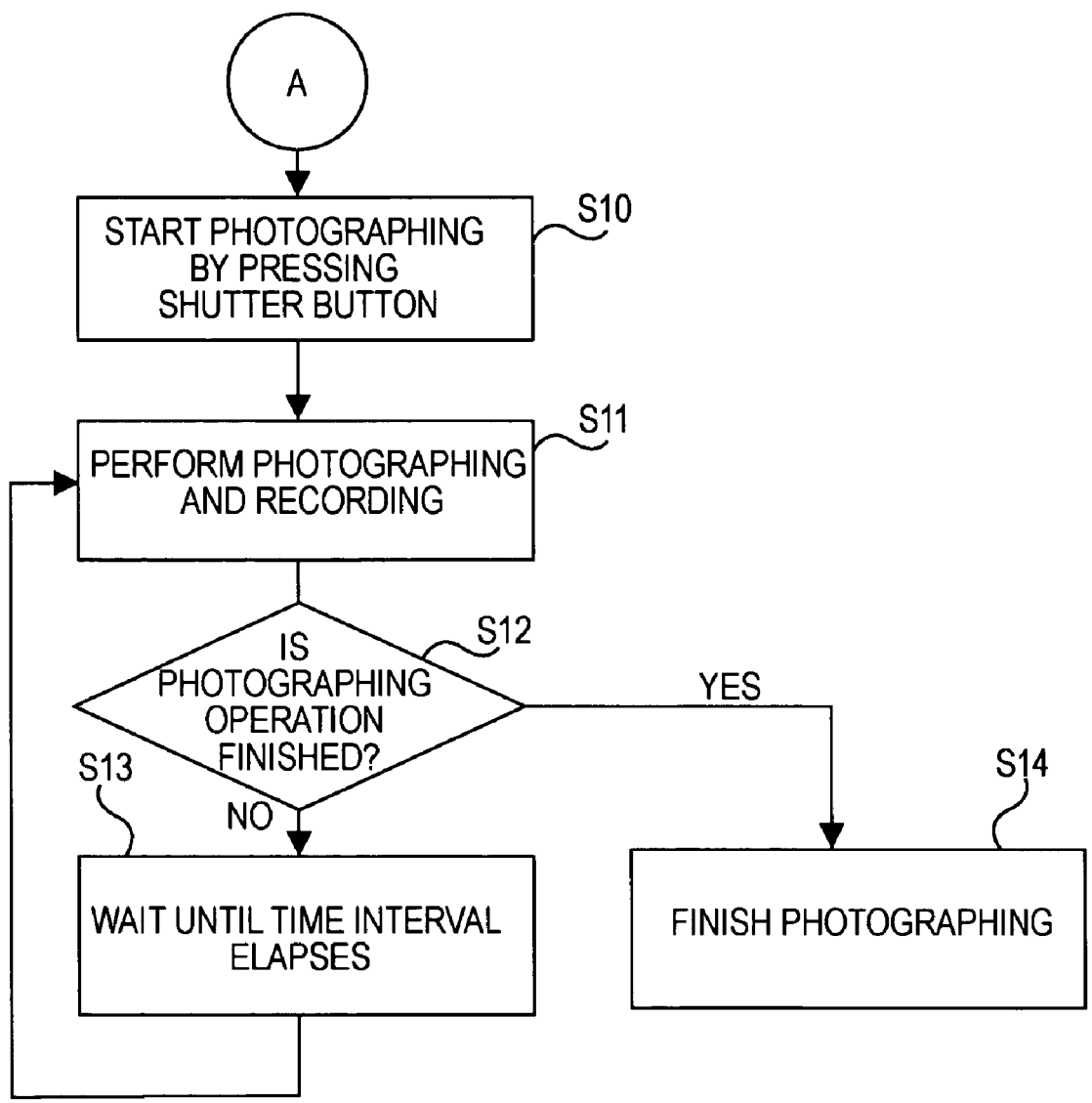

FIG. 5

|  | SIZE(mm) | FRAME RATE(f/s) |
|---|---|---|
| FINE | 640 × 480 | 30 |
| STANDARD | 640 × 480 | 15 |
| 160 mm | 160 × 120 | 15 |

IMAGING APPARATUS

CROSS REFERENCES TO RELATED APPLICATIONS

The present invention contains subject matter related to Japanese Patent Application JP 2005-225106 filed in the Japanese Patent Office on Aug. 3, 2005, the entire contents of which are incorporated herein by reference.

BACKGROUND OF THE INVENTION

1. Field of the Invention

The present invention relates to an imaging apparatus that performs interval photographing for regularly capturing still images or moving pictures at desired time intervals in various photographing modes.

2. Description of the Related Art

Generally, in a digital still camera having an interval photographing function, a photographer performs interval photographing by setting a desired photographing time interval.

In this case, the time interval should be set in accordance with the purpose of interval photographing, and a short time interval can be set in a range of several seconds, and a long time interval can be set in a range of several tens of hours.

In digital still cameras having an interval photographing function, when photographing continues for a long time, the amount of image data sometimes becomes large. It is thus necessary to sequentially record the image data on a recording medium, and accordingly, a time necessary for recording the image data on a recording medium should be taken into account.

The time necessary from capturing image data by photographing until finishing recording of the image data on a recording medium is hereinafter referred to as an "access time". Since the writing time in the access time varies depending on the type of recording medium, it is difficult to finish recording image data before starting the next interval photographing if the time interval for interval photographing is too short. As a result, it is difficult to perform correct interval photographing.

To overcome this drawback, a technique for setting a suitable time interval by informing the user of the shortest time interval that can be set in consideration of the minimal recording time necessary for recording image data depending on the type of recording medium has been proposed, as disclosed in, for example, Japanese Unexamined Patent Application Publication No. 6-326957.

SUMMARY OF THE INVENTION

In the interval photographing function disclosed in the related art, however, the photographing modes have not been considered very well, and photographing can only be performed under predetermined conditions. As a result, the usability of the interval photographing function is poor and restricted.

Accordingly, the above-described access time can be determined only uniformly in accordance with the restricted photographing modes, and the range of time intervals for interval photographing that can be set is also restricted, and, thus, it is difficult to set short time intervals.

For example, it is difficult to set sufficiently short time intervals when it is desired, for example, that subjects having fast motions be photographed or that a large number of frames be photographed in a short period of time. Thus, the usability of the interval photographing function becomes very poor.

If the photographing modes are fixed, it is difficult to capture images in specific modes, such as TIFF, RAW, bracket, multi-sequential photographing, other than normal photographing modes, resulting in a limit on the variety of possible images.

It is thus desirable to provide an imaging apparatus that can perform interval photographing as demanded by a user as much as possible by allowing the user to select the optimal photographing mode and time interval.

According to an embodiment of the present invention, there is provided an imaging apparatus including photographing mode selection means for allowing a user to select an interval photographing mode from among a plurality of predetermined photographing modes, determining means for determining a range of selectable time intervals for interval photographing in accordance with the interval photographing mode selected by the photographing mode selection means, notifying means for notifying the user of the range of selectable time intervals determined by the determining means, time interval selection means for allowing the user to select a time interval for interval photographing in response to the notification of the notifying means, and interval photographing control means for performing interval photographing on the basis of the interval photographing mode selected by the photographing mode selection means and the time interval selected by the time interval selection means.

According to the imaging apparatus of an embodiment of the present invention, an interval photographing mode can be selected, and interval photographing can be performed in accordance with a time interval determined based on the selected interval photographing mode. It is thus possible to perform interval photographing as demanded by a user as much as possible by allowing the user to select the optimal photographing mode and time interval.

BRIEF DESCRIPTION OF THE DRAWINGS

FIGS. 2 and 3 are flowcharts illustrating an operation for setting the time interval for interval photographing in the digital camera shown in FIG. 1;

FIG. 5 illustrates specific examples of moving-picture interval photographing modes in the digital camera shown in FIG. 1.

DESCRIPTION OF THE PREFERRED EMBODIMENTS

Figure 1:
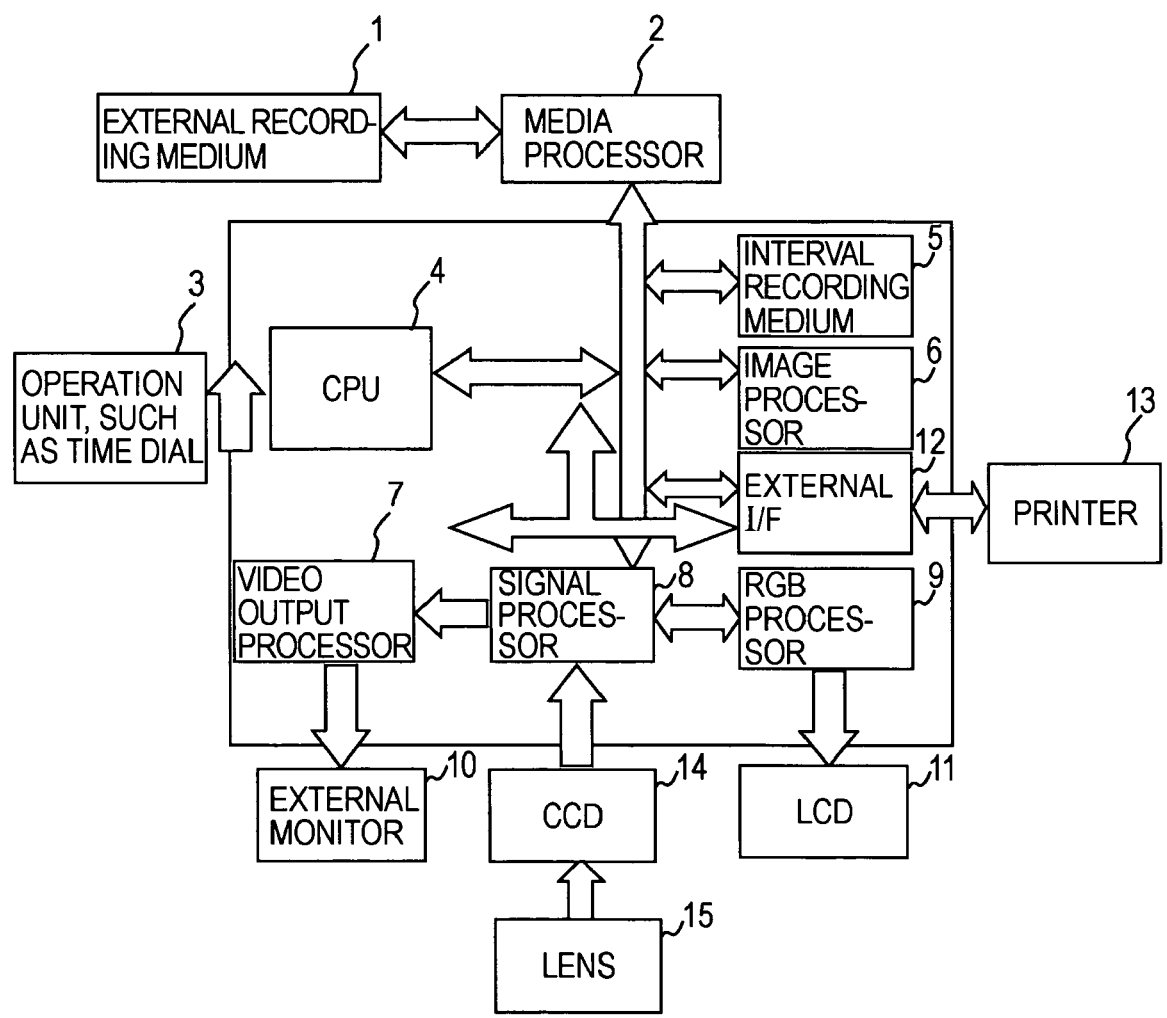
FIG. 1 is a block diagram illustrating a digital camera according to an embodiment of the present invention.

FIG. 1 is a block diagram illustrating a digital camera according to an embodiment of the present invention.

An imaging device 14 captures an image of a subject through a lens 15 by using a charge-coupled device (CCD) solid-state imaging element.

A signal processor 8 performs signal processing, such as noise suppression, on an imaging signal output from the imaging device 14.

An image processor 6 compresses an imaging signal output from the signal processor 8 or decompresses an image signal output from an external recording medium 1 or an internal recording medium 5. The internal recording medium 5 stores the imaging signal compressed by the image processor 6.

A media processor 2 converts the imaging signal compressed by the imaging processor 6 into a format corresponding to the external recording medium 1, and stores the imaging signal having the converted format on the external recording medium 1. An external interface 12 outputs the imaging signal to a printer 13 and the printer 13 performs printing in accordance with the imaging signal.

A video output processor 7 converts the imaging signal into a format corresponding to an external monitor 10 and outputs the imaging signal having the converted format to the external monitor 10. An RGB processor 9 converts the imaging signal into an RGB format signal and displays the converted imaging signal on a liquid crystal display (LCD) display unit 11.

A central processing unit (CPU) 4 controls the overall digital camera on the basis of the operation input through an operation unit 3.

In the digital camera configured as described above, two modes are provided, such as a photographing mode and a playback mode. In the photographing mode, image signals corresponding to still images or moving pictures captured by the imaging device 14 are recorded on the external recording medium 1 or the internal recording medium 5 as digital data. In the playback mode, digital data stored in the external recording medium 1 or the internal recording medium 5 is displayed on the LCD display unit 11. It is possible to switch between the photographing mode and the playback mode by a mode-switching button or dial key. The functions or the conceptual models are disconnected between the photographing mode and the playback mode.

The digital camera shown in FIG. 1 has an interval photographing function of automatically performing photographing at predetermined regular intervals, and the operation unit 3 sets the time interval and the photographing mode for performing interval photographing.

The operation unit 3 determines the range of time intervals that can be set in accordance with the type of photographing mode in interval photographing, and presents the determined time interval range to the user. It is thus possible to provide an easy-to-use imaging apparatus that can perform interval photographing as demanded by a user.

The relationship between the time interval set in interval photographing and the photographing mode is as follows.

In this embodiment, images captured during interval photographing are sequentially recorded on one of the external recording medium 1 or the internal recording medium 5. Since the access time necessary from capturing images until finishing recording of the images varies depending on the type of recording medium, it is necessary to identify the necessary access times beforehand according to the types of recording media. However, the time necessary for recording images is different depending on the amount of data to be recorded, and the amount of data is different depending on the photographing mode. Thus, it is necessary to consider the access time in relation to the photographing mode.

When determining the photographing mode, it is necessary to consider the time necessary for signal processing or imaging and the amount of data.

The time necessary for signal processing is influenced by the compression type or the compression rate. Accordingly, for example, as the compression mode, TIFF or RAW mode (non-compression) is set, and the compression rate is selected from a plurality of compression rates.

The time necessary for imaging is influenced by the type of photographing, such as sequential photographing, multi-sequential photographing, or bracket photographing. In sequential photographing, still images are sequentially photographed for every interval photographing operation, and in multi-sequential photographing, a plurality of images that are sequentially photographed for the individual interval photographing operations are disposed in one page. In the sequential photographing mode or the multi-sequential photographing mode, the number of images to be sequentially photographed at one time or the number of images disposed in one page, respectively, is set. In bracket photographing, photographing operations are repeated by changing the exposure time for every interval photographing. In the bracket photographing mode, the exposure time and the number of photographing operations are set.

The amount of data is also changed by the size and resolution of an image. Accordingly, in interval photographing, the size and resolution of an image are set. The amount of moving picture data is changed by, not only the size and resolution of an image, but also the frame rate.

The CPU 4 calculates the time necessary from capturing images until finishing recording of the images for one interval photographing operation on the basis of the photographing mode, the settings of various parameters, and the type of recording medium, and determines the calculated time as the shortest time that can be selected from the range of time intervals.

Then, the CPU 4 informs the user of the range of time intervals that can be selected by the user when interval photographing is performed, thereby enabling the user to set the suitable time interval for interval photographing.

For actual product specifications for the above-described digital camera, although it is possible to provide a variety of photographing modes, this is not practical since the operability and circuit configuration of the digital camera become complicated and the cost is increased. It is practical, therefore, that several photographing modes that are considered to be most commonly used are prepared and are selected with a simple operation.

Alternatively, instead of calculating the shortest time interval every time settings for interval photographing are conducted, the shortest time intervals in accordance with combinations of the photographing modes, parameters, and the types of recording media may be calculated beforehand, and the calculated shortest time intervals are stored in a non-volatile memory as a look-up table. Then, when interval photographing is performed, the shortest time interval is determined by referring to the look-up table.

Figure 4A:
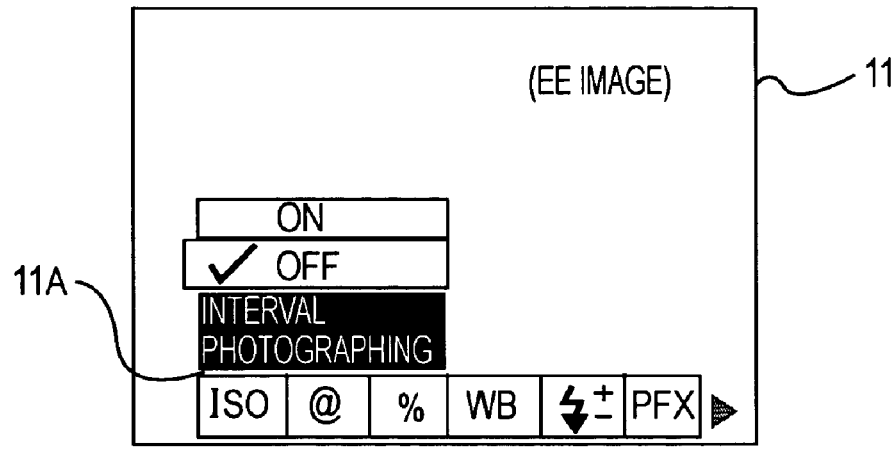
FIGS. 4A, 4B, and 4C illustrate display examples used for setting the interval photographing operation in the digital camera shown in FIG. 1.
Figure 4B:
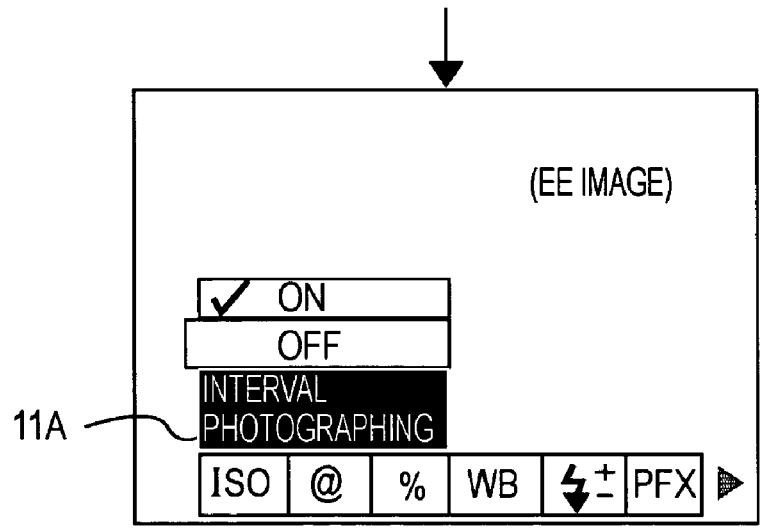
Figure 4C:
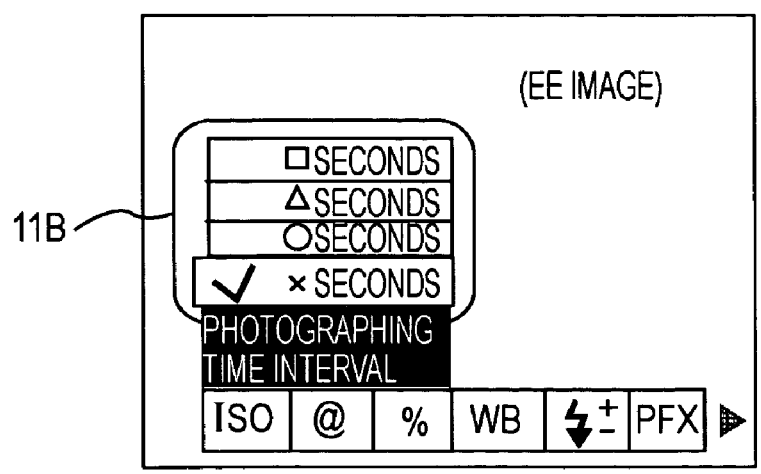

A specific example of the operation for setting the time interval for interval photographing is discussed below in the context of still image capturing with reference to the flowchart in FIGS. 2 and 3. FIGS. 4A through 4C illustrate display examples used for setting the interval photographing operation.

In step S1, the digital camera enters the still-image capturing mode. Then, in step S2, an interval photographing field 11A shown in FIGS. 4A and 4B is displayed on the LCD display unit 11 by the use of a menu button or a cross key (cursor key) of the operation unit 3, and the interval photographing field 11A is turned ON. FIGS. 4A and 4B illustrate that the interval photographing field 11A is shifted from OFF to ON.

After setting the interval photographing field 11A to be ON, the current photographing mode is checked in step S3, and the type of photographing mode is determined in step S4.

Figure 2:
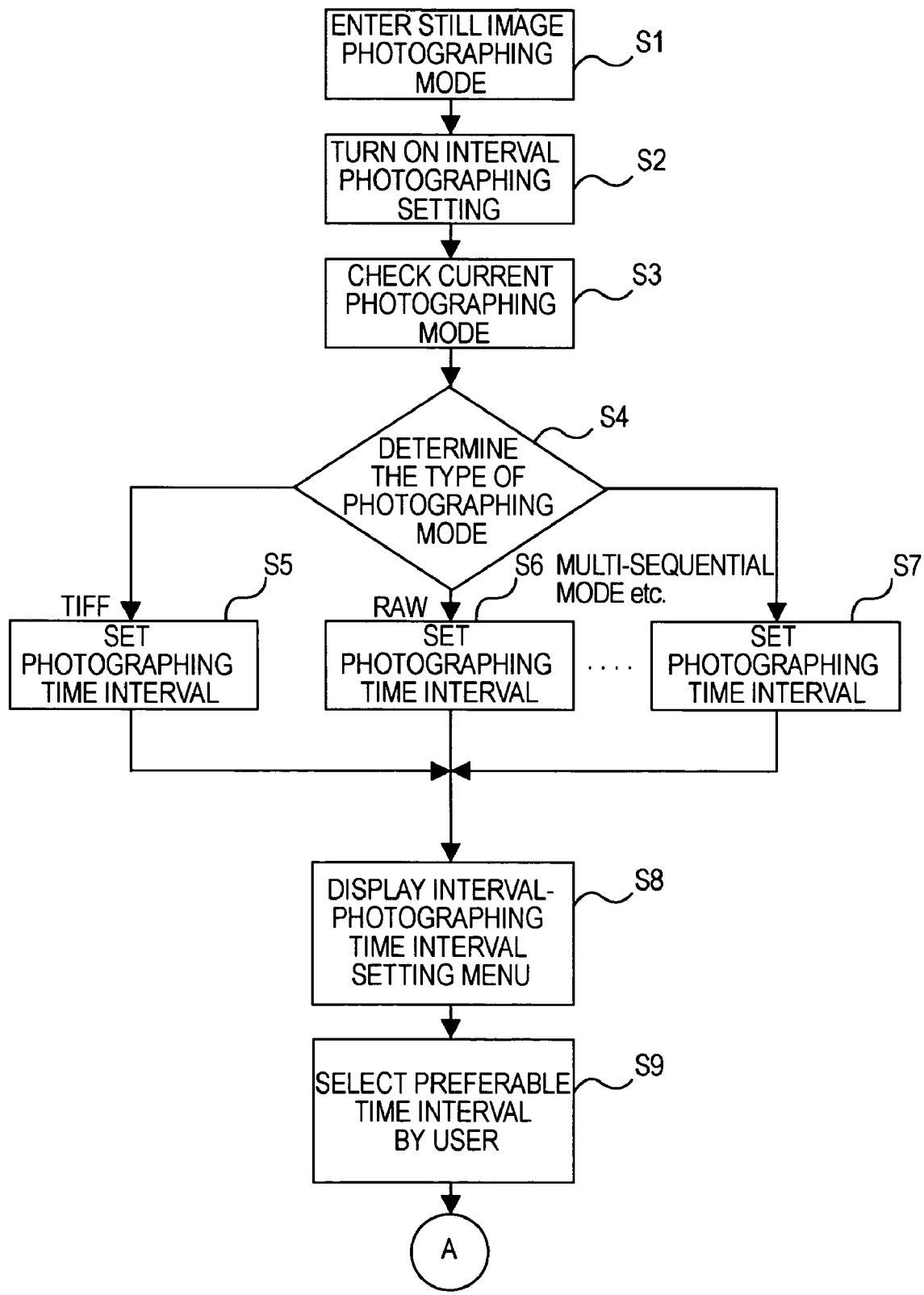

In this case, several photographing modes, such as TIFF, RAW, and multi-sequential mode, are prepared, as shown in FIG. 2, though details thereof are not described here, and the user sets the photographing mode to be used beforehand and determines the type of photographing mode in steps S3 and S4. The time intervals to be set based on the shortest time interval in each photographing mode are stored in a memory beforehand, and the user can select the suitable time interval from practical time interval candidates.

In step S5, S6, or S7, the shortest time interval in the range of interval photographing time intervals is determined.

In this case, as a standard for determining the shortest time interval in the range of time intervals for interval photographing, a predetermined margin a is set, and the value (t+a) obtained by adding the margin a to time t necessary from performing an automatic shutter operation on a single image until finishing recording of the captured image on the external recording medium 1 is set to be the shortest time interval. In the case of sequential photographing or bracket photographing, since a plurality of images are recorded, the time t is a time necessary from performing automatic shutter operations on a plurality of images until finishing recording of the captured images on the external recording medium 1.

In step S8, a time-interval setting display menu including the range of time intervals that can be selected in accordance with the shortest time interval set in step S5, S6, or S7 is presented to the user. In the example shown in FIG. 4C, a time-interval setting display menu 11B including four time intervals that can be selected is displayed. Then, in step S9, the user selects a preferable time interval by using, for example, a cross key, and sets the selected time interval by a setting key. Simultaneously, the time-interval setting display menu 11B disappears.

Instead of selecting the time interval by selecting one of the time interval candidates, as shown in FIG. 4C, the time interval may be selected by increasing or decreasing the time by a cursor key.

After setting the interval photographing mode and the time interval as described above, in step S10, the user starts the interval photographing function by manually pressing the shutter button of the operation unit 3. Then, in step S11, the user performs the first interval photographing operation. It is then determined in step S12 whether the photographing operation can be finished, i.e., whether the photographing finishing conditions are satisfied. If it is found in step S12 that the photographing finishing conditions are not satisfied, the process proceeds to step S13. In step S13, the operation enters the standby mode until the time interval for interval photographing elapses, and interval photographing is repeated by performing an automatic shutter operation every time the time interval elapses. Then, when the capacity of the external recording medium 1 becomes full of the images, or when the shutter button is pressed manually, it is determined in step S12 that the photographing finishing conditions are satisfied, and the photographing operation is finished in step S14.

In this example, the interval photographing function is started and finished by the manual operation on the shutter button. Alternatively, various other means, for example, a timer, may be used for starting and finishing the interval photographing function.

The settings of the time interval and the photographing mode have been discussed in the context of still images. For moving pictures, the photographing mode can be selected from modes, such as fine, standard, 160 mm having different data sizes and frame rates, as shown in FIG. 5. As for still images, for moving pictures, the range of time intervals for interval photographing is set in accordance with the selected photographing mode, and then, the user can select a preferable time interval from that range.

As described above, according to the digital camera of this embodiment, the user can select the interval photographing mode and can perform interval photographing at the time interval determined based on the selected interval photographing mode. This enables the user to select a suitable mode from various types of interval photographing operations, thereby contributing to enhancement of the functions of the digital camera.

Specific examples of the selection of the photographing modes are as follows:

(A) selecting a photographing mode having a short access time for photographing subjects having fast motions, such as small animals, or for taking a large number of photographs in a short period of time;

(B) selecting a photographing mode having a long access time for photographing subjects having slow motions, such as stars in the night sky;

(C) selecting a photographing mode, such as RAW or TIFF, when top priority is to be given to the quality;

(D) selecting the bracket photographing mode when the user wishes to take photographs with different exposure times and compare the resulting photographs; and (E) selecting the multi-sequential photographing mode when the user wishes to take photographs for fun.

As described above, the digital camera according to an embodiment of the present invention enables operations which are not feasible in known interval photographing, and as a result, various patterns of images can be photographed.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:

means for setting interval photography on the imaging apparatus;

means for allowing a user to select a photographing mode from among a plurality of predetermined photographing modes, wherein interval photography is performed in the selected photographing mode, and the predetermined photographing modes define mode cycles for achieving a photographic result;

means for calculating, based on a type of external recording medium, a shortest time required from the start of performing a single mode cycle according to the selected photographing mode, to a finishing of the single mode cycle following completion of writing, to the external recording medium, the one or more images required to complete the single mode cycle, and for adding a predetermined margin to the calculated shortest time;

means for determining a range of selectable time intervals for interval photography in the selected photographing mode, the range of selectable time intervals being time intervals greater than or equal to the calculated shortest time;

means for notifying the user of the range of selectable time intervals;

means for allowing the user to select a time interval for interval photographing in response to the notification; and means for performing interval photographing in the selected photographing mode according to the selected time interval.

2. The imaging apparatus according to claim 1, wherein the range of selectable time intervals for the predetermined photographing modes is stored in advance in a look-up table.

3. The imaging apparatus according to claim 1, further comprising means for displaying the range of selectable time intervals for interval photographing.

4. The imaging apparatus according to claim 1, wherein the selected photographing mode includes a data size of an image to be subjected to interval photographing.

5. The imaging apparatus according to claim 1, wherein the selected photographing mode includes a compression method and a compression rate of an image to be recorded.

6. The imaging apparatus according to claim 1, wherein the selected photographing mode includes bracket photographing for performing photographing by changing an exposure time.

7. The imaging apparatus according to claim 1, wherein the selected photographing mode includes a frame rate of moving pictures.

8. An imaging apparatus comprising:
a photographing mode selector configured to allow a user to select a photographing mode from among a plurality of predetermined photographing modes, where interval photography is performed in the selected photographing mode, and the predetermined photographing modes define mode cycles for achieving a photographic result;
a calculating unit configured to calculate, based on a type of external recording medium, a shortest time required from the start of performing a single mode cycle according to the selected photographing mode, to a finishing of the single mode cycle following completion of writing, to the external recording medium, the one or more images required to complete the single mode cycle, and adding a predetermined margin to the calculated shortest time;
a determining unit configured to determine a range of selectable time intervals for interval photographing in the selected photographing mode, the range of selectable time intervals being time intervals greater than or equal to the calculated shortest time;
a notifying unit configured to notify the user of the range of selectable time intervals;
a time interval selector configured to allow the user to select a time interval for interval photographing in response to the notification; and
an interval photographing controller configured to perform interval photographing in the selected photographing mode according to the selected time interval.

9. A computer-implemented method comprising:
selecting interval photography;
selecting a photographing mode from among a plurality of photographing modes, wherein interval photography is performed in the selected photographing mode, and the photographing modes define mode cycles for achieving a photographic result;
calculating, based on a type of external recording medium, a shortest time required from the start of performing a single mode cycle according to the selected photographing mode, to a finishing of the single mode cycle following completion of writing, to the external recording medium, the one or more images required to complete the single mode cycle;
adding a predetermined margin to the calculated shortest time to determine a minimum interval time;
determining a range of selectable time intervals for interval photographing in the selected photographing mode, the range of selectable time intervals being time intervals greater than or equal to the minimum interval time;
notifying a user of the range of selectable time intervals;
allowing the user to select a time interval for interval photographing in response to the notification; and
performing, by a processor, interval photographing in the selected photographing mode according to the selected time interval.

10. A computer-readable storage medium storing instructions which, when executed by a processor, perform a method comprising:
selecting interval photography;
selecting a photographing mode from among a plurality of photographing modes, wherein interval photography is performed in the selected photographing mode, and the photographing modes define mode cycles for achieving a photographic result;
calculating, based on a type of external recording medium, a shortest time required from the start of performing a single mode cycle according to the selected photographing mode, to a finishing of the single mode cycle following completion of writing, to the external recording medium, the one or more images required to complete the single mode cycle;
adding a predetermined margin to the calculated shortest time to determine a minimum interval time;
determining a range of selectable time intervals for interval photographing in the selected photographing mode, the range of selectable time intervals being time intervals greater than or equal to the minimum interval time;
notifying a user of the range of selectable time intervals;
allowing the user to select a time interval for interval photographing in response to the notification; and
performing interval photographing in the selected photographing mode according to the selected time interval.

* * * * *

UNITED STATES PATENT AND TRADEMARK OFFICE
CERTIFICATE OF CORRECTION

PATENT NO. : 7,574,129 B2  Page 1 of 1
APPLICATION NO. : 11/488865
DATED : August 11, 2009
INVENTOR(S) : Kumiko Tsukuda It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 369 days.

Signed and Sealed this

Seventh Day of September, 2010

David J. Kappos
*Director of the United States Patent and Trademark Office*